(12) United States Patent
Shiki

(10) Patent No.: US 8,883,066 B2
(45) Date of Patent: Nov. 11, 2014

(54) POROUS MEMBRANE, PROCESS FOR PRODUCING POROUS MEMBRANE, PROCESS FOR PRODUCING CLARIFIED LIQUID, AND POROUS-MEMBRANE MODULE

(71) Applicant: Asahi Kasei Chemicals Corporation, Tokyo (JP)

(72) Inventor: Satoshi Shiki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 13/936,835

(22) Filed: Jul. 8, 2013

(65) Prior Publication Data
US 2013/0292866 A1  Nov. 7, 2013

Related U.S. Application Data

(62) Division of application No. 13/063,021, filed as application No. PCT/JP2009/066546 on Sep. 24, 2009.

(30) Foreign Application Priority Data

Sep. 26, 2008  (JP) .................................. 2008-248578
Sep. 26, 2008  (JP) .................................. 2008-248816

(51) Int. Cl.
| | |
|---|---|
| *B01D 69/08* | (2006.01) |
| *C12H 1/07* | (2006.01) |
| *B01D 71/68* | (2006.01) |
| *B01D 69/02* | (2006.01) |
| *B01D 61/14* | (2006.01) |
| *C02F 1/44* | (2006.01) |

(52) U.S. Cl.
CPC .............. *B01D 69/02* (2013.01); *C12H 1/063* (2013.01); *B01D 71/68* (2013.01); *B01D 69/087* (2013.01); *B01D 69/088* (2013.01); *B01D 2325/34* (2013.01); *B01D 61/145* (2013.01); *B01D 2325/36* (2013.01); *B01D 2325/38* (2013.01); *C02F 1/444* (2013.01)
USPC ......................................... 264/558; 264/45.1

(58) Field of Classification Search
None
See application file for complete search history.

(56) References Cited

U.S. PATENT DOCUMENTS

| | | | |
|---|---|---|---|
| 4,935,141 | A | 6/1990 | Buck et al. |
| 4,976,859 | A | 12/1990 | Wechs |

(Continued)

FOREIGN PATENT DOCUMENTS

| | | |
|---|---|---|
| CN | 1087841 | 6/1994 |
| CN | 101227965 | 7/2008 |

(Continued)

OTHER PUBLICATIONS

U.S. Appl. No. 13/120,753 to Chihiro Kato et al., which was filed on Mar. 24, 2011.

(Continued)

*Primary Examiner* — Monica Huson
(74) *Attorney, Agent, or Firm* — Greenblum & Bernstein, P.L.C.

(57) ABSTRACT

A porous membrane with the membrane wall constructed of a hydrophobic polymer and a hydrophilic polymer, wherein when the membrane wall is divided into 3 sections in the film thickness direction to form region "a" containing one wall surface A of the membrane wall, region "c" containing the other wall surface C and region "b" between region "a" and region "c", the hydrophilic polymer content ratio $C_a$ in region "a" is greater than the hydrophilic polymer content ratio $C_c$ in region "c", and the mean pore size of the wall surface C is larger than the mean pore size of the wall surface A.

7 Claims, 6 Drawing Sheets

(56) References Cited

U.S. PATENT DOCUMENTS

| | | |
|---|---|---|
| 5,846,422 A | 12/1998 | Ditter et al. |
| 5,906,742 A | 5/1999 | Wang et al. |
| 6,284,137 B1 | 9/2001 | Hajikano et al. |
| 2006/0108288 A1 | 5/2006 | Oishi |
| 2008/0197072 A1 | 8/2008 | Ansorge et al. |
| 2009/0110900 A1 | 4/2009 | Yokota et al. |

FOREIGN PATENT DOCUMENTS

| | | |
|---|---|---|
| EP | 0 568 045 | 11/1993 |
| EP | 0 647 465 | 4/1995 |
| EP | 1 634 610 | 3/2006 |
| EP | 1064073 | 6/2006 |
| EP | 1 891 999 | 2/2008 |
| JP | 62-038205 | 2/1987 |
| JP | 1-094901 | 4/1989 |
| JP | 2-211231 | 8/1990 |
| JP | 3-258330 | 11/1991 |
| JP | 2001-515396 | 9/2001 |
| JP | 2002-502692 | 1/2002 |
| JP | 3585175 | 11/2004 |
| JP | 2007-289886 | 11/2007 |
| WO | 97/22405 | 6/1997 |
| WO | 99/40996 | 8/1999 |
| WO | 2006/131290 | 12/2006 |

OTHER PUBLICATIONS

English language Abstract for WO 96/40421 corresponding to JP 2001-515396, published Sep. 18, 2001.

International Search Report for PCT/JP2009/066546, mailed Dec. 15, 2009.

International Preliminary Report on Patentability for PCT/JP2009/066546, mailed May 19, 2011.

European Search Report for counterpart European application No. 09816169.8, dated Jul. 16, 2012.

Chinese Office Action issued with respect to counterpart Chinese Application No. 200980137271.9.

(A)

(B)

POROUS MEMBRANE, PROCESS FOR PRODUCING POROUS MEMBRANE, PROCESS FOR PRODUCING CLARIFIED LIQUID, AND POROUS-MEMBRANE MODULE

CLAIM FOR PRIORITY

This application is a Divisional of U.S. application Ser. No. 13/063,021, which is a National Phase Application of International Application PCT/JP2009/066546 filed Sep. 24, 2009, and claims the priority benefit of Japanese Applications No. 2008-248816, filed Sep. 26, 2008 and No. 2008-248578, filed Sep. 26, 2008. The content of U.S. application Ser. No. 13/063,021 is expressly incorporated by reference in its entirety.

TECHNICAL FIELD

The present invention relates to a porous membrane, a process for producing a porous membrane, a process for producing a clarified liquid and a porous membrane module.

BACKGROUND ART

Conventional processes employed for removing microbial particles such as yeast or bacterial cells from aqueous solutions include gel filtration processes, centrifugal separation processes, adsorptive separation processes, precipitation processes and membrane filtration processes. However, gel filtration processes are difficult to apply for industrial purposes because the target substances are diluted by the solvents used for gel filtration, rendering such processes unsuitable for bulk treatment. Centrifugal separation processes can only be applied for microbial particles with sizes of several μm or greater, and for aqueous solutions of low viscosity. Adsorptive separation processes can be utilized for removal of certain trace microbial particles, but the processes cannot be applied for aqueous solutions in which many different microorganisms are dispersed in large quantities. Precipitation processes can be utilized for treatment of relatively large amounts of aqueous solutions, but microbial particles cannot be completely removed by such processes alone.

On the other hand, membrane filtration processes that employ microfiltration membranes or ultrafiltration membranes can remove various types of microorganisms and are suitable for industrial use as they permit continuous bulk treatment.

Examples of membranes used in such membrane filtration processes include polysulfone hollow fiber membranes having large pore sizes on the inner surface and having small pore sizes on the outer surface, as described in Patent document 1 or Patent document 2.

CITATION LIST

Patent Literature

[Patent document 1] International Patent Publication No. 97/22405
[Patent document 2] Japanese Patent Publication No. 3585175

SUMMARY OF INVENTION

Technical Problem

With conventional porous membranes, however, a layer of the removed microorganisms or their disrupted cells is formed on the membrane surface causing plugging of the membrane surface, or fine particles of the removed matter are adsorbed inside the membrane causing plugging of the membrane pores, and these phenomena lead to problems such as increased filtration pressure and gradual decrease in filtration rate with time.

Back washing has been used as a method for washing material that has accumulated on the membrane surface and inside the membrane, but with conventional porous membranes it has been necessary to circulate a large amount of backwash fluid to wash off the removed matter that has become firmly adsorbed onto the membrane surface and inside the membrane.

It is an object of the present invention to provide a porous membrane that is resistant to accumulation of removed matter on the membrane surface and inside the membrane, that is resistant to plugging of the membrane pores, that can maintain a high filtration rate for prolonged periods and that can be easily washed, as well as a process for producing it. It is another object of the invention to provide a process for producing a clarified liquid using the porous membrane.

Solution to Problem

Specifically, the invention provides a porous membrane whose membrane wall is constructed of a hydrophobic polymer and a hydrophilic polymer, wherein when the membrane wall is divided into 3 sections in the film thickness direction to form region "a" containing one wall surface A of the membrane wall, region "c" containing the other wall surface C and region "b" between region "a" and region "c", the hydrophilic polymer content ratio $C_a$ in region "a" is greater than the hydrophilic polymer content ratio $C_c$ in region "c", and the mean pore size of the wall surface C is larger than the mean pore size of the wall surface A.

Such a porous membrane has higher strength to withstand temperature change or pressure change than conventional porous membranes, allows both an excellent filtration rate and fractionation property to be obtained, is resistant to accumulation of removed matter on the membrane surface and inside the membrane, is resistant to plugging of the membrane pores, can maintain a high filtration rate for prolonged periods and is easy to wash. For example, a liquid to be treated that is transported to the wall surface C side of the porous membrane passes in through the porous membrane interior where matter is removed, being clarified before flowing out to the wall surface A side.

The porous membrane of the invention preferably satisfies the following inequality (I).

$$C_a > C_b > C_c \quad (I)$$

[In inequality (I), $C_a$ represents the hydrophilic polymer content ratio in region "a", $C_b$ represents the hydrophilic polymer content ratio in region "b" and $C_c$ represents the hydrophilic polymer content ratio in region "c".]

The porous membrane has a relatively low hydrophilic polymer content ratio in region "c" through which the liquid to be treated passes first, and therefore removed matter is readily adsorbed and excellent filtration performance is exhibited. On the other hand, the hydrophilic polymer content in region "a" through which the liquid to be treated passes last is relatively high, so that deposition of the removed matter and its associated membrane pore plugging can be prevented. Region "b" between these two regions has a satisfactory balance between the two features. Consequently, the porous membrane having such a construction exhibits superior filtration performance while being more resistant to membrane pore plugging and maintaining a high filtration rate for prolonged periods.

The porous membrane of the invention also preferably satisfies the following inequality (II).

$$P_a < P_b < P_c \quad (II)$$

[In inequality (II), $P_a$ represents the mean pore size of a cross-section in region "a", $P_b$ represents the mean pore size of a cross-section in region "b" and $P_c$ represents the mean pore size of a cross-section in region "c".]

Such a porous membrane can reject matter in region "c" that has not been rejected at the wall surface C, can remove matter in region "b" that has not been rejected even in region "c", and can reject matter in region "a" that has not been rejected even in region "b". That is, the porous membrane exhibits more excellent fractionation performance by rejecting matter that is to be removed in stages.

The porous membrane of the invention preferably has its minimum pore size layer, with minimum pore sizes in the cross-section of the membrane wall, present in region "a". If the minimum pore size layer is present in region "a" which has a high hydrophilic polymer content ratio, it will be possible to more reliably prevent plugging of membrane pores by adsorption of particles. The cross-section referred to here is the cross-section cut perpendicular to the membrane wall of the porous membrane.

The porous membrane of the invention preferably has a structure in which the pore sizes decrease in a continuous manner from the wall surface C to the minimum pore size layer. Such a construction can produce an even more satisfactory depth filtration effect to hold removed matter inside the membrane, while maintaining a high filtration rate for prolonged periods.

The porous membrane of the invention preferably has a mean pore size of 1 μm-50 μm on the wall surface C, a rejecting pore size of at least 0.1 μm and less than 1 μm in region "a", and a membrane wall film thickness of 300 μm-1000 μm. Such a porous membrane is suitable for clarification of beer fermentates, and allows efficient removal of microorganisms and their disrupted cells that are present in beer fermentates.

The porous membrane of the invention also preferably has a hydrophilic polymer content of 0.2 wt %-3 wt % based on the total weight of the porous membrane. Such a porous membrane will have more excellent cleanability and can maintain high filtration performance even with repeated filtration and washing.

The porous membrane of the invention also preferably satisfies the following inequality (III). Such a porous membrane can more reliably exhibit both excellent filtration performance in region "c" and an effect of preventing plugging of membrane pores by deposited removed matter in region "a".

$$C_a/C_c > 2 \quad (III)$$

[In inequality (III), $C_a$ represents the hydrophilic polymer content ratio in region "a" and $C_c$ represents the hydrophilic polymer content ratio in region "c".]

The porous membrane of the invention also preferably has a hydrophilic polymer content in region "a" of 0.3 wt %-3.5 wt %, based on the total weight of region "a". Such a porous membrane will have even more excellent cleanability.

In addition, the hydrophobic polymer of the porous membrane of the invention is preferably polysulfone. Such a porous membrane will exhibit more excellent strength against temperature changes and pressure changes, and will be able to maintain high filtration performance for prolonged periods.

The porous membrane of the invention may be a porous hollow fiber membrane wherein the wall surface A is the outer surface and the wall surface C is the inner surface. A hollow fiber membrane is a membrane having a hollow circular form, and by having such a shape it can increase the membrane surface area per unit volume of the module, compared to a flat membrane. The porous hollow fiber membrane preferably has an inner diameter of between 1000 μm and 2000 μm.

The invention further provides a process for producing the aforementioned porous membrane, which comprises a solidifying step in which an internal solidifying solution is discharged from the internal fluid channel of the double-tube nozzle while a membrane-forming solution, comprising a hydrophobic polymer, a hydrophilic polymer, a good solvent for both of these polymers and a non-solvent for the hydrophobic polymer, is discharged from the external fluid channel of the double-tube nozzle, for solidification in the external solidifying solution. This production process can easily produce a porous membrane according to the invention as described above.

The external solidifying solution in the production process of the invention is preferably a solidifying solution composed mainly of water and having higher solidifying power for the membrane-forming solution than the internal solidifying solution. Such a production process can reliably produce a porous membrane according to the invention.

The membrane-forming solution for the production process of the invention is preferably a membrane-forming solution with a solution viscosity of between 30 Pa·sec and 200 Pa·sec at the temperature at which it is discharged from the double-tube nozzle. Such a membrane-forming solution can be stably extruded from a double-tube nozzle at a constant flow rate, and thus allows production of a porous membrane with more uniform membrane performance.

The hydrophilic polymer in the production process of the invention is preferably polyvinylpyrrolidone with a weight-average molecular weight of between 20,000 and 1,000,000. Using such a hydrophilic polymer will facilitate preparation of a membrane-forming solution having the suitable solution viscosity described above.

Also, the non-solvent in the production process of the invention is preferably glycerin. Such a non-solvent will facilitate preparation of the membrane-forming solution, prevent changes in the composition during storage and render the composition more manageable.

The internal solidifying solution used for the production process of the invention is preferably an aqueous solution comprising at least 80 wt % and less than 100 wt % of a good solvent for the hydrophobic polymer. Such a production process can reliably produce a porous membrane according to the invention.

In the production process of the invention, a portion of the hydrophilic polymer is preferably removed using an oxidizing agent-containing aqueous solution either during or after the solidifying step. Such a production process will allow the hydrophilic polymer content of the porous membrane to be easily adjusted, to facilitate production of a porous membrane with excellent filtration performance and cleanability.

According to the invention, the process for producing a porous hollow fiber membrane is preferably a process in which an air-gap section surrounded by a tubular piece is provided between the surface of the double-tube nozzle over which the internal solidifying solution and membrane-forming solution flow out and the liquid surface of the external solidifying solution, and the outflow comprising the internal solidifying solution and membrane-forming solution is directed through the air-gap section and reaches the liquid surface of the external solidifying solution for the aforementioned solidifying step, with the following inequality (IV) being satisfied, where St is the base area of the tubular piece on the liquid surface side of the external solidifying solution, So is the outer surface area of the outflow that passes through the air-gap section, and Ha is the absolute humidity at the center of the air-gap section surrounded by the tubular piece.

$$650<(St/So)\times Ha<3724 \quad (IV)$$

Such a production process will allow the pore size of the porous membrane to be easily adjusted and can therefore reliably produce a porous membrane according to the invention.

The invention still further provides a process for producing a clarified liquid that comprises a filtration step in which a suspended solid-containing liquid is filtered with the porous membrane described above. Since filtration is accomplished with the porous membrane described above in this production process, it is possible to continuously obtain a liquid with the suspended solids adequately removed.

The suspended solid-containing liquid used for the production process of the invention may be a fermentate, for example. The fermentate may be a beer fermentate, for example.

The filtration in the production process of the invention is preferably internal pressure filtration. Preferably, the internal pressure filtration in the production process of the invention is carried out by cross-flow filtration, whereby the suspended solid-containing liquid is conveyed along the membrane wall of the porous membrane while being filtered by the membrane wall, and the clarified liquid is discharged from the pores, with the suspended solid-containing liquid concentrated by the filtration being extracted, and the liquid conveyance speed of the suspended solid-containing liquid is between 0.2 msec and 2.5 msec as the linear speed. According to this production process it is possible to reduce the possibility of suspended solid fragmentation and contamination of the filtrate by the fragments, while also resulting in a more satisfactory filtration rate and filtration performance.

The production process of the invention also preferably comprises a step in which the filtrate obtained in the filtration step is used for back washing of the porous membrane. Back washing can remove sediment on the porous membrane surface or inside the membrane to allow the filtration performance of the porous membrane to be maintained for prolonged periods.

The invention further provides a filtrate obtained by filtration with the porous membrane. The filtrate of the invention is a filtrate with a low suspended solid concentration and low turbidity compared to filtrates obtained by diatomaceous earth filtration or the like, which has been used for filtration of beer and the like in the prior art.

The invention still further provides a porous membrane module comprising the porous membrane. Using the porous membrane of the invention in a module allows filtration to be accomplished in a practical manner.

Advantageous Effects of Invention

According to the invention it is possible to provide a porous membrane that is resistant to accumulation of removed matter on the membrane surface and inside the membrane, that is resistant to plugging of the membrane pores, that can maintain a high filtration rate for prolonged periods and that can be easily washed, as well as a process for producing it. According to the invention it is also possible to provide a process for producing a clarified liquid using the porous membrane.

DESCRIPTION OF EMBODIMENTS

Figure 1:
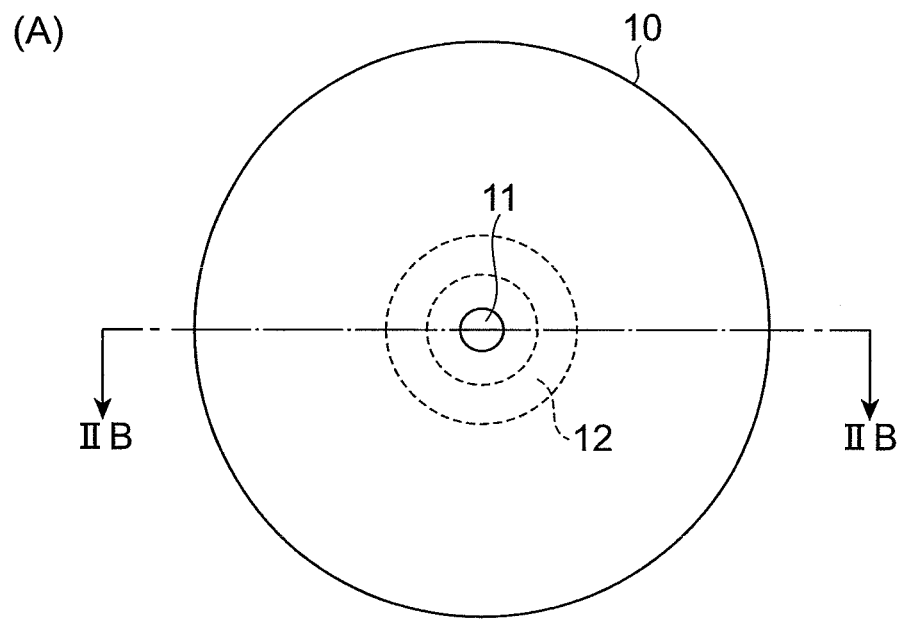
FIG. 1 is a cross-sectional view showing a preferred double-tube nozzle for production of a porous membrane according to the present embodiment.
Figure 1:
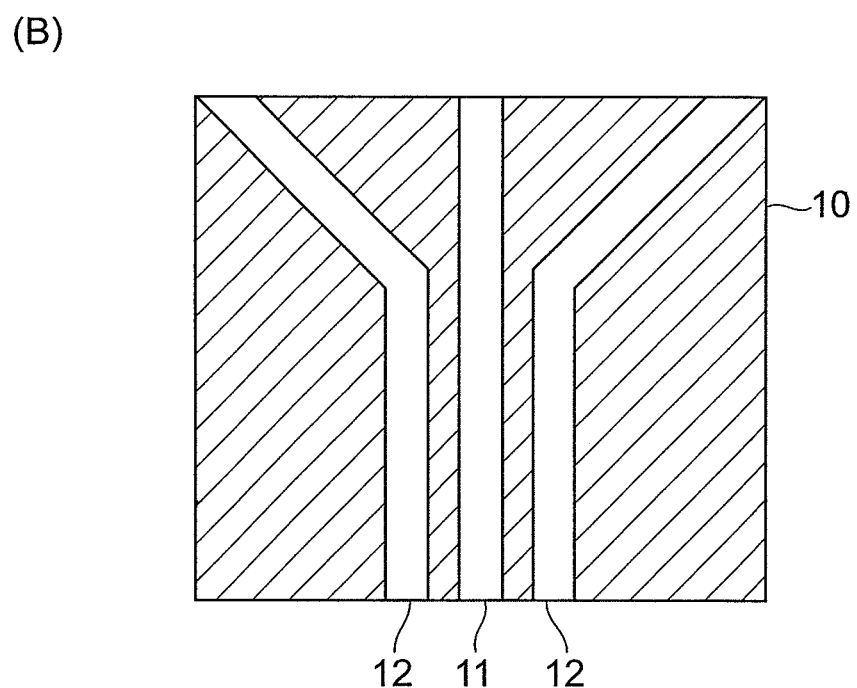
Figure 2:
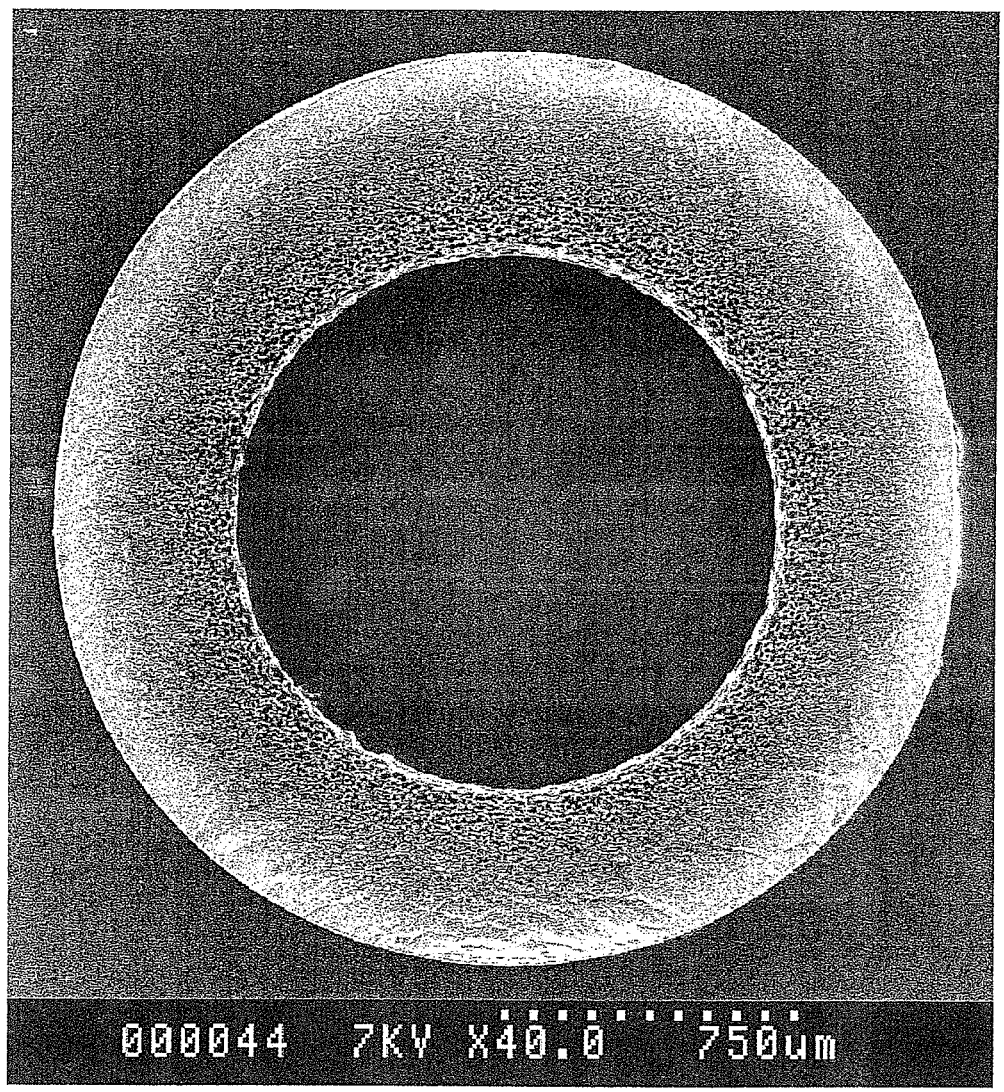
FIG. 2 is a photomicrograph showing a cross-section of the porous membrane of Example 1.
Figure 3:
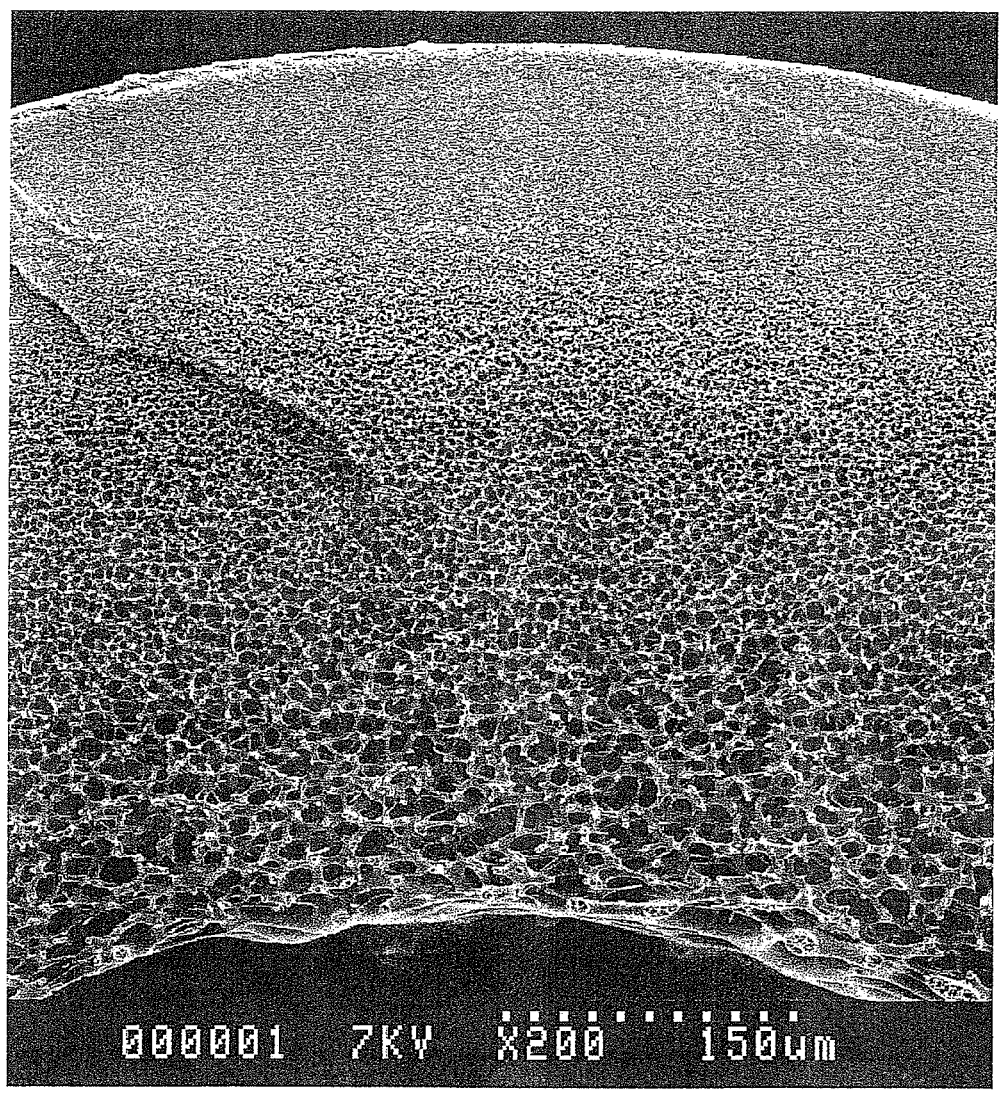
FIG. 3 is a photomicrograph showing a cross-section of the membrane wall of the porous membrane of Example 1.
Figure 4:
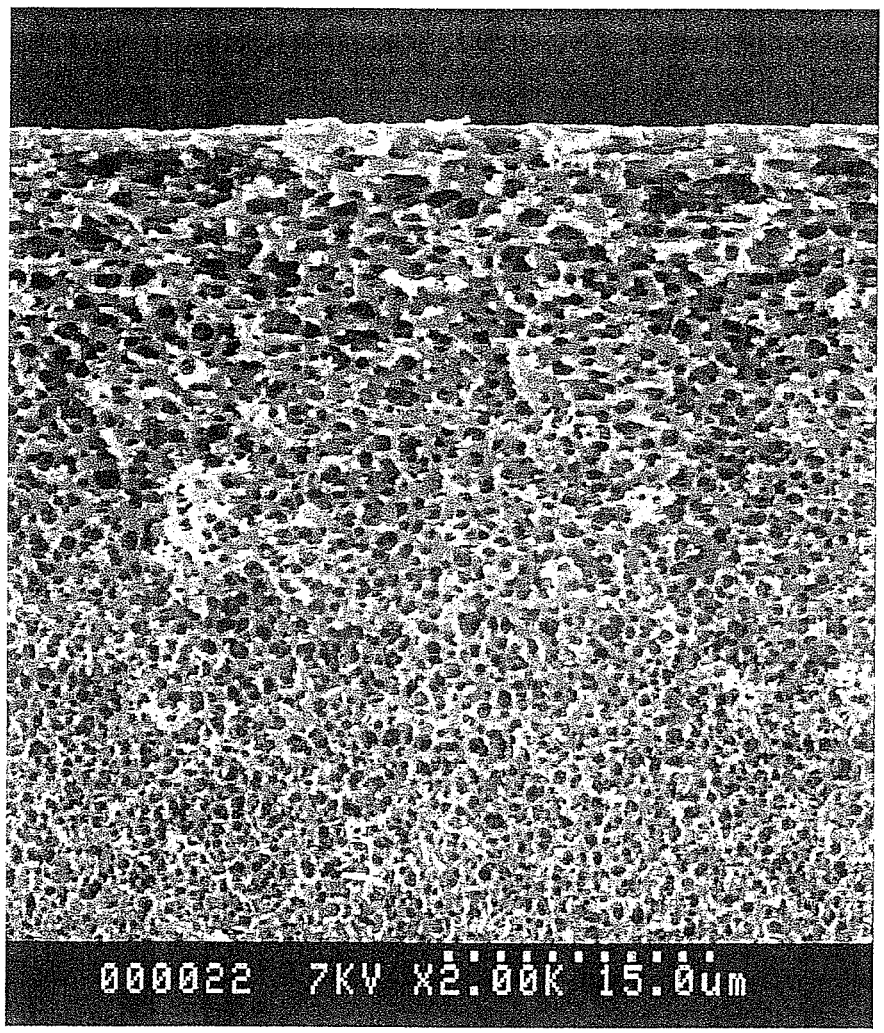
FIG. 4 is a photomicrograph showing a cross-section of region "a" of the porous membrane of Example 1.
Figure 5:
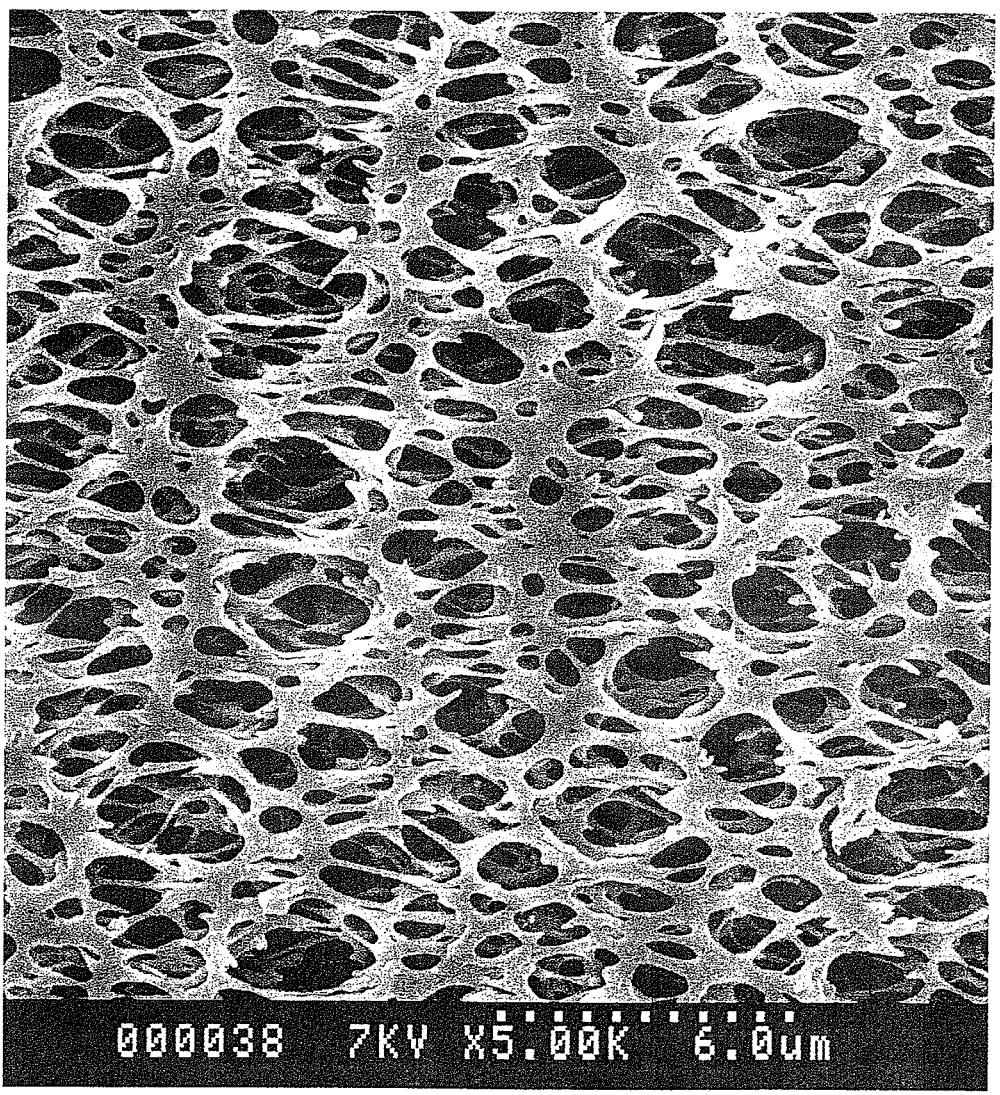
FIG. 5 is a photomicrograph showing a cross-section of the outer surface (wall surface A) of the porous membrane of Example 1.
Figure 6:
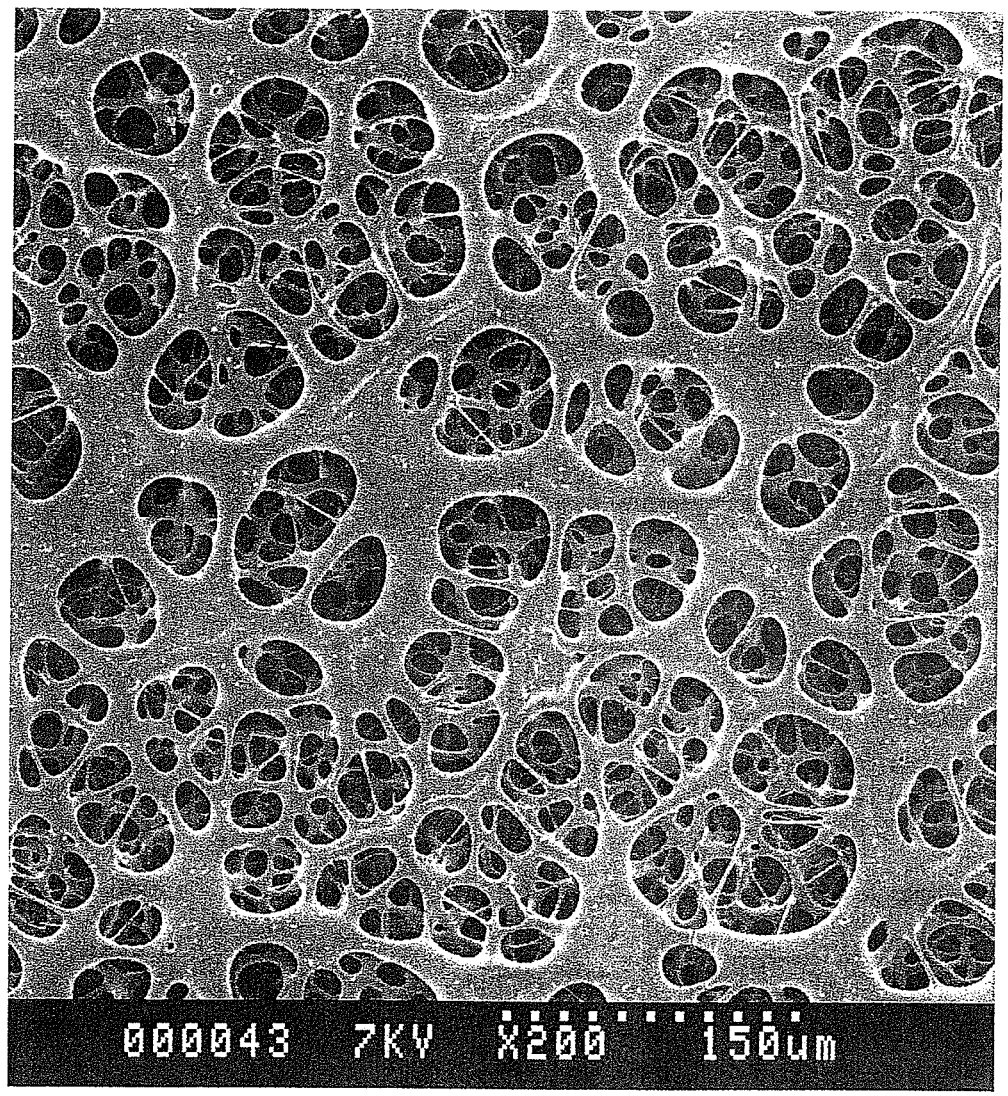
FIG. 6 is a photomicrograph showing a cross-section of the inner surface (wall surface C) of the porous membrane of Example 1.

A preferred embodiment of the invention will now be described in detail.

The porous membrane according to this embodiment is a porous membrane with a membrane wall constructed of a hydrophobic polymer and a hydrophilic polymer, wherein when the membrane wall is divided into 3 sections in the film thickness direction to form region "a" containing one wall surface A of the membrane wall, region "c" containing the other wall surface C and region "b" between region "a" and region "c", the hydrophilic polymer content ratio $C_a$ in region "a" is greater than the hydrophilic polymer content ratio $C_c$ in region "c", and the mean pore size of the wall surface C is larger than the mean pore size of the wall surface A. Here, division of the membrane wall into 3 sections in the film thickness direction means that it has 3 sections with the thickness of each layer in the range of 33±5 with respect to 100 as the total film thickness.

Such a porous membrane has higher strength to withstand temperature change or pressure change than conventional porous membranes, allows both an excellent filtration rate and fractionation property to be obtained, is resistant to accumulation of removed matter on the membrane surface and inside the membrane, is resistant to plugging of the membrane pores, can maintain a high filtration rate for prolonged periods, and is easy to wash.

In order to divide the membrane wall into 3 sections in the film thickness direction for partitioning into 3 regions, a portion of the membrane wall may be cut out to obtain a film-like membrane wall and sliced into 3 sections in the film thickness direction. Here, the ⅓ region with a thickness including one wall surface A of the membrane wall will be referred to as "region 'a'", the ⅓ region with a thickness including the other wall surface C will be referred to as "region 'c'", and the center section between region "a" and region "c" will be referred to as "region 'b'".

A hydrophobic polymer is a polymer having a critical surface tension (γc) of less than 50 mN/m at 20° C., and a hydrophilic polymer is a polymer having a critical surface tension (γc) of at least 50 mN/m at 20° C. The mean pore size can be calculated by observing the wall surface A or wall surface C using an electron microscope at a magnification that allows observation of ten or more holes in a single visual field, and treating the pores in the photomicrograph as near circles to determine the diameter from the area mean value.

That the membrane wall is composed of a hydrophobic polymer and a hydrophilic polymer means that the membrane wall comprises both a hydrophobic polymer and a hydrophilic polymer, regardless of the phase structure (for example, it may be a compatible or phase-separated system, although it is preferably not a completely compatible system).

In the porous membrane, the hydrophilic polymer content ratio of region "a" including wall surface A is larger than the hydrophilic polymer content ratio of region "c" including wall surface C, and the mean pore size of wall surface C is larger than the mean pore size of wall surface A. With such a construction, the porous membrane will have higher strength to withstand temperature change or pressure change than conventional porous membranes, will exhibit an even more excellent filtration rate and fractionation property, will be resistant to accumulation of removed matter on the membrane surface and inside the membrane, will be resistant to plugging of the membrane pores and will be able to maintain a high filtration rate for prolonged periods, while also being easier to wash than known membrane washing processes. The washing process may be, for example, back washing wherein the washing fluid is circulated in the filtration direction and the reverse direction, or air scrubbing wherein the membrane is oscillated by introduction of air bubbles into the module to remove the accumulated matter.

For example, a liquid to be treated that is transported to the wall surface C side of the porous membrane passes in through the porous membrane interior where matter is removed, being clarified before flowing out to the wall surface A side. A porous membrane having such a construction can adequately exhibit an effect of depth filtration whereby particles smaller than the membrane pores are held inside the membrane at region "c", for their removal. On the other hand, since the hydrophilic polymer content ratio is high and the adsorptive power between the particles and membrane is low in region "a", it is possible to prevent plugging of the membrane pores by particle adsorption. By preventing plugging of the membrane pores by adsorption of particles in region "a" which has a small pore size, it is possible to maintain a high filtration rate for prolonged periods. Moreover, since a depth filtration effect can be adequately exhibited in region "c" which has a large pore size, the filtration performance, including the fractionation property, is excellent.

The porous membrane preferably satisfies the following inequality (I).

$$C_a > C_b > C_c \quad (I)$$

[In inequality (I), $C_a$ represents the hydrophilic polymer content ratio in region "a", $C_b$ represents the hydrophilic polymer content ratio in region "b" and $C_c$ represents the hydrophilic polymer content ratio in region "c".]

The porous membrane has a relatively low hydrophilic polymer content ratio in region "c" through which the liquid to be treated passes first, and therefore removed matter is readily adsorbed and excellent filtration performance is exhibited. On the other hand, the hydrophilic polymer content in region "a" through which the liquid to be treated passes last is relatively high, so that deposition of the removed matter and its associated membrane pore plugging can be prevented. Region "b" between these two regions has a satisfactory balance between the two features. Consequently, the porous membrane having such a construction exhibits superior filtration performance while being more resistant to membrane pore plugging and maintaining a high filtration rate for prolonged periods.

The porous membrane also preferably satisfies the following inequality (II).

$$P_a < P_b < P_c \quad (II)$$

[In inequality (II), $P_a$ represents the mean pore size of a cross-section in region "a", $P_b$ represents the mean particle size of a cross-section in region "b" and $P_c$ represents the mean particle size of a cross-section in region "c".]

Such a porous membrane can reject matter in region "c" that has not been rejected at the wall surface C, can remove matter in region "b" that has not been rejected even in region "c", and can reject matter in region "a" that has not been rejected even in region "b". That is, the porous membrane exhibits more excellent fractionation performance by rejecting removed matter in stages. The cross-section of region "a" is the surface cut perpendicular to the membrane wall of the porous membrane. The mean pore size can be calculated by observing each cross-section using an electron microscope at a magnification that allows observation of ten or more holes in a single visual field, and treating the pores in the photomicrograph as near circles to determine the diameter from the area mean value.

As examples of hydrophilic polymers there may be mentioned polyvinylpyrrolidone, polyethylene glycol, polyvinyl alcohol, cellulose, and substances derived from the foregoing. Preferred among these as hydrophilic polymers are polyvinylpyrrolidone, polyethylene glycol and their derivatives, with polyvinylpyrrolidone being more preferred. Any one of these hydrophilic polymers may be used alone, or two or more thereof may be used in admixture. These hydrophilic polymers have excellent compatibility with hydrophobic polymers and their porous membranes are homogeneous and have excellent mechanical strength. Furthermore, washing is facilitated since adsorption of removed matter on the membrane surface and inside the membrane can be further prevented.

As examples of hydrophobic polymers there may be mentioned polysulfone-based polymers such as polysulfone (for example, a 20° C. critical surface tension (γc) of 45 mN/m) and polyethersulfone (for example, a 20° C. critical surface tension (γc) of 41 mN/m), or polyvinylidene fluoride (for example, a 20° C. critical surface tension (γc) of 25 mN/m), polyvinylidene chloride, polyvinyl chloride, polyacrylonitrile (for example, a 20° C. critical surface tension (γc) of 44 mN/m), and the like. Preferred among these as hydrophobic polymers are polysulfone-based polymers and polyvinylidene fluoride, with polysulfone-based polymers being more preferred when using polyvinylpyrrolidone as the hydrophilic polymer. Any one of these hydrophobic polymers may be used alone, or two or more thereof may be used in admixture. With these hydrophobic polymers, the porous hollow fiber membrane will exhibit even more excellent strength against temperature changes or pressure changes, and high filtration performance can be achieved.

The mean pore size of the wall surface C is preferably between 1 μm and 50 μm, more preferably between 5 μm and 40 μm and even more preferably between 10 μm and 30 μm. Such a porous membrane is suitable for clarification of beer fennentates, and allows efficient removal of microorganisms and their disrupted cells that are present in beer fermentates. If the mean pore size of the wall surface C is at least 1 μm, it will be possible to exhibit an adequate depth filtration effect to hold removed matter inside the membrane, and plugging of the membrane pores due to accumulation of removed matter on the membrane surface will be minimized. Also, if the mean pore size of the wall surface C is 50 μm or smaller, the proportion of the pores on the membrane surface will not be too great and it will be possible to maintain satisfactory porous membrane strength. In order to limit the mean pore size of the wall surface C to within the range specified above, the good solvent concentration of the solidifying solution on the wall surface C side may be set to 85 wt % or greater, for example, in the production processes described below.

The mean pore size of the wall surface A is preferably between 0.1 μm and 20 μm, more preferably between 0.2 μm and 15 μm and even more preferably between 0.3 μm and 10 μm. In order to limit the mean pore size of the wall surface A to within the range specified above, the temperature of the solidifying solution on the wall surface A side may be set to between 50° C. and 90° C., for example, in the production processes described below.

Region "a" preferably has a rejecting pore size of at least 0.05 μm and less than 1 μm, it more preferably has a rejecting pore size of at least 0.1 μm and less than 1 μm, and it even more preferably has a rejecting pore size of between 0.2 μm and 0.8 μm. A rejecting pore size of at least 0.05 μm will help to prevent excessively large permeation resistance and can prevent increase in the pressure required for filtration, and when filtration of a solution containing microbial particles is carried out, for example, it will be possible to avoid membrane surface plugging and reduction in filtration efficiency caused by destruction and deformation of the microbial particles. A sufficient fractionation property will be obtained if the size is less than 1 μm. In order to limit the rejecting pore size of region "a" to within the range specified above, the temperature of the solidifying solution on the wall surface A side may be set to between 50° C. and 90° C., for example, in the production processes described below.

The "rejecting pore size" referred to here means the particle size for a particle permeation rejecting rate of 90%, when a particle dispersion containing dispersed particles of fixed size are filtered using the porous membrane. Specifically, the particle dispersion is filtered and the change in particle concentration is measured before and after filtration, for example. The measurement is conducted while varying the particle size from 0.1 μm at a pitch of about 0.1 μm, and a rejection curve is drawn for the particles. The 90% rejectable particle size is read from the rejection curve, and this size may be used as the rejecting pore size.

The porous membrane preferably comprises a minimum pore size layer in region "a". If the minimum pore size layer is present in region "a" which has a high hydrophilic polymer content ratio, it will be possible to more reliably prevent plugging of membrane pores by adsorption of particles. The minimum pore size layer is the layer containing the smallest pore size as determined with observation of a cross-section of the porous membrane with an electron microscope. The pore size of the minimum pore size layer is approximately equal to the rejecting pore size, and therefore the pore size of the minimum pore size layer can be obtained by measuring the rejecting pore size. The pore size of the minimum pore size layer is preferably at least 0.05 μm and less than 1 μm, more preferably at least 0.1 μm and less than 1 μm, and even more preferably between 0.2 μm and 0.8 μm. In order to include the minimum pore size layer in region "a", the good solvent concentration of the solidifying solution may be 85 wt % or greater on the wall surface C side and the good solvent concentration of the solidifying solution may be up to 50 wt % on the wall surface A side in the production process described below.

The porous membrane has a film thickness of preferably between 300 μm and 1000 μm and more preferably between 350 μm and 800 μm. If the porous membrane has a film thickness of at least 300 μm, the range in which removed matter can be held inside the membrane will not be limited and it will be possible to obtain a sufficient depth filtration effect, while in addition, the filtration rate will tend to be lowered less easily. With a porous membrane having a film thickness of up to 1000 μm, it will be possible to accomplish stable washing of removed matter accumulated inside the membrane, and the filtration performance after washing will be satisfactorily restored. For the film thickness to be within this range, the gap of the external fluid channel in the double-tube nozzle may be set to 200 μm-1200 μm (preferably 300 μm-1000 μm), for example, in the production process described below.

The porous membrane preferably has its pore size reducing continuously from the wall surface C to the minimum pore size layer. Such a construction can produce an even greater depth filtration effect to hold removed matter inside the membrane, while maintaining a high filtration rate for prolonged periods. In order to have the pore size reducing continuously from the wall surface C to the minimum pore size layer, the good solvent concentration of the solidifying solution may be 85 wt % or greater on the wall surface C side and the good solvent concentration may be up to 50 wt % on the wall surface A side, for example, in the production process described below.

The porous membrane has a hydrophilic polymer content of preferably between 0.2 wt % and 3 wt %, more preferably between 0.3 wt % and 2.5 wt % and even more preferably between 0.5 wt % and 2 wt %, based on the total weight of the porous membrane. A porous hollow fiber membrane having a hydrophilic polymer content of at least 0.2 wt % will be resistant to adsorption of removed matter on the membrane surface and inside the membrane and also to plugging of the membrane pores, thus allowing stable washing. A porous hollow fiber membrane with a hydrophilic polymer content of no greater than 3 wt % will be resistant to plugging of the membrane pores caused by swelling of the hydrophilic polymer, so that increase in permeation resistance can be prevented and high filtration performance can be maintained. In order to limit the hydrophilic polymer content to within this range, the ratio of the hydrophobic polymer and hydrophilic polymer in the membrane-forming solution comprising the hydrophobic polymer and hydrophilic polymer may be former:latter=(1):(0.1-1.5) (preferably former:latter=(1):(0.5-1.3)), for example, in the production process described below.

The porous membrane also preferably satisfies the following inequality (III).

$$C_a/C_c \geq 2 \qquad (III)$$

[In inequality (III), $C_a$ represents the hydrophilic polymer content ratio in region "a" and $C_c$ represents the hydrophilic polymer content ratio in region "c".]

Such a porous membrane can more reliably exhibit both excellent filtration performance in region "c" and an effect of preventing plugging of membrane pores by deposited removed matter in region "a". The porous membrane with the hydrophilic polymer in such a distribution will exhibit a more excellent depth filtration effect in region "c" and a more excellent effect of preventing plugging of the membrane pores due to adsorption of removed matter in region "a". It will also have excellent cleanability, and will be able to maintain high filtration performance even with repeated filtration and washing. To further increase these effects, preferably $C_a/C_c \geq 2.2$ and more preferably $C_a/C_c \geq 2.4$. For inequality (III) to be satisfied, the ratio of the hydrophobic polymer and hydrophilic polymer in the blend of the hydrophobic polymer and hydrophilic polymer may be former:latter=(1):(0.1-1.5)

(preferably former:latter=(1):(0.3-1.2)), for example, in the production process described below.

The concentration of the hydrophilic polymer in region "a" of the porous membrane is preferably between 0.3 wt % and 3.5 wt %, more preferably between 0.4 wt % and 3.0 wt % and even more preferably between 0.5 wt % and 2.5 wt %. A hydrophilic polymer concentration of at least 0.3 wt % will result in satisfactory restoration by washing, while a content of no greater than 3.5 wt % can minimize elution by the filtering fluid.

The porous membrane may be sterilized by autoclave treatment. Sterilization by autoclave treatment will allow the porous membrane to be suitably used for filtration of microbial particles. When autoclave treatment is performed, the hydrophobic polymer is preferably one with low variation in water permeation before and after autoclave treatment. Specifically, the change in water permeation before and after autoclave treatment ($F_{AC}/F_0$), as determined from the purified water permeation before autoclave treatment ($F_0$) and the purified water permeation after treatment ($F_{AC}$), is preferably at least 0.9 and less than 1.1. Polysulfone-based polymers may be mentioned as examples of such hydrophobic polymers.

The porous membrane of this embodiment may be a porous hollow fiber membrane whose membrane wall is composed of a hydrophobic polymer and a hydrophilic polymer, wherein when the membrane wall is divided into 3 sections in the film thickness direction for separation into three regions, the hydrophilic polymer content ratio of the outer periphery region including the outer surface (wall surface A) (region "a") is greater than the hydrophilic polymer content ratio of the inner periphery region including the inner surface (wall surface C) (region "c"), and the mean pore size of the inner surface is greater than the mean pore size of the outer surface. A hollow fiber membrane is a membrane having a hollow tubular form, and by having such a shape it can increase the membrane surface area per unit volume of the module, compared to a flat membrane.

The porous hollow fiber membrane preferably has an inner diameter of between 1000 μm and 2000 μm. If the inner diameter is at least 1000 μm, it will be possible to carry out continuous filtration even when filtering easily aggregating suspended solids such as microbial particles, without the hollow fiber inlet openings being obstructed by the aggregated suspended solids. Also, if the inner diameter is no greater than 2000 μm, the thickness of a single porous hollow fiber membrane will not be too large, thus helping to ensure a large effective membrane surface area per module and preventing reduction in filtration performance. For the inner diameter to be within this range, the diameter of the internal fluid channel in the double-tube nozzle may be set to 500 μm-2500 μm (preferably 600 μm-2200 μm), for example, in the production process described below.

A process for producing a porous membrane according to this embodiment will now be explained in detail using as an example a process for producing a porous hollow fiber membrane (hereinafter also referred to as "process for producing a porous hollow fiber membrane or simply "production process of this embodiment").

The process for producing a porous hollow fiber membrane comprises a solidifying step in which the following discharges (extrusions) (1) and (2) are carried out simultaneously for solidification in the external solidifying solution.
(1) Discharge of internal solidifying solution from the internal fluid channel of the double-tube nozzle, and
(2) Discharge of a membrane-forming solution comprising a hydrophobic polymer, a hydrophilic polymer, a good solvent for both of these polymers and a non-solvent for the hydrophobic polymer, from the external fluid channel of the double-tube nozzle.

Such a production process can conveniently produce a porous hollow fiber membrane. The solution preferably passes through the air-gap section after the discharges (extrusions) (1) and (2) and before solidification in the external solidifying solution. Here, "passes through the air-gap section" means that membrane-forming solution discharged from the double-tube nozzle first passes through the air (or through a gas such as an inert gas) without immediately contacting the external solidifying solution.

FIG. 1 is a cross-sectional view showing a preferred double-tube nozzle for production of a porous membrane according to the present embodiment. Here, the double-tube nozzle 10 is a nozzle having an internal fluid channel 11 formed at the center section of the nozzle and an external fluid channel 12 formed surrounding it, with a partition formed between the fluid channels. The internal fluid channel 11 of the double-tube nozzle 10 is preferably circular in the cross-section perpendicular to the lengthwise direction of the nozzle, while the external fluid channel 12 of the double-tube nozzle is preferably annular in the cross-section perpendicular to the lengthwise direction of the nozzle, and preferably both fluid channels are concentric (having a common center).

The internal solidifying solution is preferably an aqueous solution comprising a good solvent for the hydrophobic polymer at 80 wt % or greater and less than 100 wt % based on the total weight of the internal solidifying solution, from the viewpoint of suitably adjusting the hydrophilic polymer distribution. From the viewpoint of obtaining a porous hollow fiber membrane with an inner surface pore size of at least 5 μm, the aqueous solution preferably comprises the solvent at 85 wt % or greater and less than 98 wt %. The temperature of the internal solidifying solution is preferably in the range of −30 to +30° C., as the temperature of the membrane-forming solution at discharge from the double-tube nozzle, in order to minimize variation in performance due to changes in the liquid temperature.

The good solvent for the hydrophobic polymer may be N-methyl-2-pyrrolidone (NMP), dimethylformamide (DMF), dimethylacetamide (DMAC), dimethyl sulfoxide (DMSO) or the like, any of which may be used alone or in admixture. For example, N-methyl-2-pyrrolidone or dimethylacetamide is preferred when polysulfone is used as the hydrophobic polymer, and N-methyl-2-pyrrolidone is more preferred when polyvinylpyrrolidone is used as the hydrophilic polymer.

The external solidifying solution is preferably a solidifying solution composed mainly of water and having higher solidifying power for the membrane-forming solution than the internal solidifying solution. Using such an external solidifying solution, it is possible to obtain a porous hollow fiber membrane having a larger inner surface pore size than the outer surface pore size, with the pore size decreasing continuously from the inner surface side toward the minimum pore size layer. The solidifying power can be measured by thinly casting a transparent membrane-forming solution onto glass and determining the speed at which turbidity is produced when the solidifying solution runs downward, and a solidifying solution with a high turbidity speed is a solidifying solution with strong solidifying power. The temperature of the external solidifying solution is preferably between 30° C. and 90° C. and more preferably between 50° C. and 85° C.

A good solvent for both the hydrophobic polymer and hydrophilic polymer is a solvent that produces no insoluble components when 30 g of the hydrophobic polymer or hydrophilic polymer is dissolved in 100 g of solvent. As good solvents that dissolve both polymers there are preferred, from the viewpoint of stability of the membrane-forming solution, solvents comprising at least 80% and more preferably at least 90% of a mixed solvent including one or more selected from among N-methyl-2-pyrrolidone (NMP), dimethylformamide (DMF) and dimethylacetamide (DMAC). From the viewpoint of convenient manageability and obtaining high water permeability, the good solvent preferably contains N-methyl-2-pyrrolidone.

The content of the good solvent for both the hydrophobic polymer and hydrophilic polymer in the membrane-forming solution is preferably between 40 wt % and 75 wt % and more preferably between 50 wt % and 70 wt % based on the total weight of the membrane-forming solution.

A non-solvent for the hydrophobic polymer is a solvent that produces insoluble components when 5 g of the hydrophobic polymer is dissolved in 100 g of solvent. As non-solvents for hydrophobic polymers there may be mentioned water and alcohol compounds. Glycerin is preferred among these, from the viewpoint of easier preparation of the membrane-forming solution, formation of a hydrophilic polymer distribution, resistance to changes in the composition during storage and ease of handling.

The content of the non-solvent in the membrane-forming solution is preferably between 0.5 wt % and 15 wt % and more preferably between 1 wt % and 10 wt % based on the total weight of the membrane-forming solution.

The membrane-forming solution preferably has a solution viscosity of between 30 Pa·sec and 200 Pa·sec and more preferably between 40 Pa·sec and 150 Pa·sec, at the temperature at which it is discharged from the double-tube nozzle. If the solution viscosity is at least 30 Pa·sec, the membrane-forming solution discharged from the external fluid channel of the double-tube nozzle when forming the porous hollow fiber membrane will not drip down of its own weight, allowing a longer running time to be taken, and therefore this is preferred for production of a porous hollow fiber membrane with a film thickness of 300 μm or greater and a pore size of 0.1 μm or greater. If the solution viscosity is no greater than 200 Pa·sec, then stable extrusion will be possible at a constant flow rate from the double-tube nozzle, and variations in membrane performance can thus be prevented.

In the production process of this embodiment, the hydrophilic polymer is preferably polyvinylpyrrolidone with a weight-average molecular weight of between 20,000 and 1,000,000 and more preferably polyvinylpyrrolidone of between 200,000 and 900,000, and from the viewpoint of suitable distribution and content of the hydrophilic polymer it is even more preferably polyvinylpyrrolidone of between 400,000 and 800,000. Using such a hydrophilic polymer will facilitate adjustment of the membrane-forming solution having a solution viscosity in the preferred range specified above.

The content of the hydrophilic polymer in the membrane-forming solution is preferably between 8 wt % and 30 wt % and more preferably between 10 wt % and 25 wt % based on the total weight of the membrane-forming solution. Also, the content of the hydrophobic polymer in the membrane-forming solution is preferably between 15 wt % and 30 wt % and more preferably between 18 wt % and 25 wt % based on the total weight of the membrane-forming solution. If the contents of the hydrophilic polymer and hydrophobic polymer are within these ranges, it will be possible to easily adjust the membrane-forming solution to have a solution viscosity in the preferred range specified above, while it will also be possible to obtain a porous hollow fiber membrane with a hydrophilic polymer content in the preferred range specified above.

In the production process for this embodiment, a portion of the hydrophilic polymer is preferably removed using an oxidizing agent-containing aqueous solution either simultaneously or after the solidifying step (preferably after the solidifying step). As examples of oxidizing agent-containing aqueous solutions there may be mentioned sodium hypochlorite aqueous solution and hydrogen peroxide aqueous solution. According to this production process, the hydrophilic polymer content ratio and the hydrophilic polymer content in each region are within the ranges specified above, allowing a porous hollow fiber membrane with more excellent filtration performance and cleanability to be obtained. When a sodium hypochlorite aqueous solution is used as the oxidizing agent-containing aqueous solution, an aqueous solution with a concentration of between 100 ppm and 50,000 ppm can be used, and the decomposition time and temperature can be modified by the type and content of the hydrophilic polymer used, to adjust the hydrophilic polymer content and distribution. For example, when a hydrophilic polymer with a molecular weight of 25,000 is used, with 2000 ppm of sodium hypochlorite, it is possible to adjust the content and distribution of the hydrophilic polymer by limiting the decomposition time to within 3 hours and washing with hot water at 90° C. for 3 hours.

The production process according to this embodiment is preferably a process for producing a porous membrane comprising a solidifying step in which the internal solidifying solution and the membrane-forming solution are simultaneously discharged from the double-tube nozzle to the air-gap section formed by a tubular piece surrounding the area between the nozzle surface and the solidifying solution surface, and after passing through the air-gap section, are solidified in the external solidifying solution, with the following inequality (IV) being satisfied, where St is the base area of the tubular piece surrounding the air-gap section, So is the outer surface area of the porous hollow fiber membrane that inserted in the air-gap section, and Ha is the absolute humidity at the center of the air-gap section surrounded by the tubular piece. This production process allows the pore size of the porous membrane to be easily adjusted and can therefore reliably produce a porous membrane according to the invention.

$$650 < (St/So) \times Ha < 3724 \qquad (IV)$$

A (St/So)×Ha value of greater than or equal to 650 can yield a hollow fiber porous membrane that can maintain a high filtration rate for prolonged periods, while a value of less than or equal to 3724 will allow stable production of a hollow fiber porous membrane according to the invention with no variation in performance. The tubular piece used in this case may be circular cylindrical or polygonal cylindrical, but in order to limit variation in performance, the distance between the cylinder wall surface and the outer surface of the hollow fiber membrane is preferably uniform. Several hollow fiber membranes may also be formed into a single tubular piece.

When the porous membrane of this embodiment is a flat membrane, it may be obtained, for example, by using a known method to cast the membrane-forming solution onto a base material such as a nonwoven fabric impregnated with the internal solidifying solution, and then solidifying it in the external solidifying solution.

The porous membrane of this embodiment may also be used to make a porous membrane module.

A preferred mode of the process for producing a clarified liquid according to the invention will now be explained in detail.

The process for producing a clarified liquid according to this mode comprises a filtration step in which a suspended solid-containing liquid is filtered with the porous membrane described above. According to this production process, it is possible to continuously and rapidly obtain a liquid with the suspended solids adequately removed. Clarification means that at least a portion of the suspended solids in the liquid before filtration are removed.

The suspended solid-containing liquid may be a liquid containing suspended solids that comprise fine organic material, inorganic material and an organic/inorganic mixture with sizes of no greater than the μm order, and ship ballast water or fermentate is especially suitable for use. Fermentates include beverages such as wine and beer, foods such as vinegar, and various suspensions obtained by enzyme reaction, but the production process of this mode is particularly suitable for obtaining beer fermentate wherein the yeast has been removed from beer yeast fermentate. "Beer" refers to beer produced conventionally using barley and hops as materials, and also includes effervescent beverages produced using materials other than barley. According to the production process of this mode, it is possible to produce satisfactorily clarified beer fermentate with high production efficiency and low contamination of disrupted yeast and the like.

In the filtration step, filtration is preferably carried out by conducting the liquid to be treated (suspended solid-containing liquid) from the wall surface C of the porous membrane to the wall surface A. That is, when the porous membrane is a hollow fiber membrane, filtration is preferably carried out by internal pressure filtration. With filtration in this manner, the characteristics of the porous membrane will be satisfactorily exhibited, a high filtration rate can be maintained for prolonged periods, cellular disruption and deformation is minimized and membrane washing can be accomplished easily with high treatment efficiency.

Filtration is preferably accomplished by cross-flow filtration in the filtration step. Cross-flow filtration is a filtration process in which, in the case of a porous hollow fiber membrane, for example, a liquid containing suspended solids is introduced into the tube from one end of the porous hollow fiber membrane and conveyed along the membrane wall, while clarified liquid that has been filtered at the membrane wall is discharged from the hole and the suspended solid-containing liquid concentrated by filtration is removed from the other end of the porous hollow fiber membrane.

The liquid conveyance speed in cross-flow filtration is preferably a linear speed of between 0.2 m/sec and 2.5 m/sec. A liquid conveyance speed of at least 0.2 m/sec will avoid lowering of the filtration rate, while a speed of no greater than 2.5 m/sec will help avoid disruption of the suspended solids such as yeast in the liquid, thus preventing contamination of the filtrate by disrupted matter. When the suspended solids are highly susceptible to deformation and disruption by external force, the speed is preferably between 0.2 m/sec and 2.0 m/sec and more preferably between 0.2 m/sec and 0.9 m/sec.

The production process according to this mode also preferably comprises a step in which the filtrate obtained in the filtration step is used for back washing of the porous membrane. Back washing allows periodic removal of sediment on the porous membrane surface or inside the membrane to allow the filtration performance of the porous membrane to be maintained for prolonged periods. It will also be possible to maintain a sufficient filtration rate for prolonged periods at low pressure and a low liquid conveyance speed, so that disruption of suspended solids such as yeast in the liquid can be further prevented.

EXAMPLES

The present invention will now be explained in greater detail based on examples and comparative examples, with the understanding that the invention is in no way limited to the examples.

The following methods were used for measurement of the inner surface pore sizes and outer surface pore sizes, measurement of the cross-section pore sizes, measurement of the pore sizes of the minimum pore size layers, measurement of the inner diameter, outer diameter and film thickness of the porous hollow fiber membrane, measurement of the polyvinylpyrrolidone content ratio, measurement of the polyvinylpyrrolidone distribution, measurement of the solution viscosity of the membrane-forming solution, measurement of the weight-average molecular weight of the polyvinylpyrrolidone and measurement of the filtration performance, for the porous membranes obtained in the examples and comparative examples described below.

(1) Measurement of Pore Sizes of Outer Surface (Wall Surface A) And Inner Surface (Wall Surface C)

One surface of the freeze-dried porous membrane was observed using an electron microscope at a magnification allowing observation of 10 or more pores in a single visual field. The pores in the obtained photomicrograph were treated as near circles and the diameter determined from the area mean value was recorded as the mean pore size.

(2) Measurement of Cross-Section Pore Size

The cross-section of the freeze-dried porous membrane was continuously observed in the film thickness direction using an electron microscope at a magnification in which no greater than 1/10 of the film thickness fit in a single visual field, and at least 10 of these photomicrographs were linked to obtain a continuous photograph in the cross-sectional film thickness direction. A line was drawn perpendicular to the film thickness direction in the obtained photograph, and the lengths at which the line longitudinally crossed pores was measured. The section with the shortest length crossing the pores was recorded as the minimum pore size layer. For the porous membranes of the examples, it was confirmed that the pore sizes decreased continuously from the inner surface (wall surface C) to the minimum pore size layer. On the other hand, no such pore size distribution could be observed in the hollow fiber membrane of Comparative Example 1.

(3) Method for Determining Pore Size of Minimum Pore Size Layer

Polystyrene latex particles were dispersed in a 0.5 wt % sodium dodecylsulfate aqueous solution to a particle concentration of 0.01 wt % to prepare a latex particle dispersion. The porous membrane was used for filtration of the latex particle dispersion, and the change in the latex particle concentration before and after filtration was measured. The measurement was conducted while varying the latex particle size from 0.1 μm at a pitch of about 0.1 μm, and a rejection curve was drawn for the latex particles. The 90% rejecting particle size was read from the rejection curve, and the size was used as the pore size of the minimum pore size layer.

(4) Measurement of Porous Membrane Inner Diameter, Outer Diameter and Mean Film Thickness.

The porous membrane was cut into a thin circular tube shape and observed under a measuring microscope, and the inner diameter (μm) and outer diameter (μm) of the porous membrane were measured. The following formula (IV) was used to calculate the film thickness from the obtained inner diameter and outer diameter.

Film thickness (μm)=(outer diameter−inner diameter)/2         (IV)

(5) Measurement of Polyvinylpyrrolidone Content Ratio (for Polysulfone Membrane)

The porous membrane was subjected to $^1$H-NMR measurement under the following conditions, and calculation was performed by the following formula (V) from the integral ($I_{PVP}$) of the signal for polyvinylpyrrolidone (4H) appearing near 1.85-2.5 ppm and the integral ($I_{PSF}$) of the signal for polysulfone (4H) appearing near 7.3 ppm, in the obtained spectrum.

[Measuring Conditions]
Apparatus: JNM-LA400 (JEOL Corp.)
Resonance frequency: 400.05 MHz
Solvent: Deuterated DMF
Sample concentration: 5 wt %
Number of scans: 256

Polyvinylpyrrolidone content ratio (wt %)=111($I_{PVP}$/4)/442($I_{PS}$/4)+111($I_{PVP}$/4)}×100      [Formula (V)]

(6) Measurement of Polyvinylpyrrolidone Distribution

When the membrane wall of the porous membrane was divided into 3 sections in the film thickness direction for separation into 3 regions, samples were taken of a section of region "a" including the outer surface (wall surface A), a section of region "c" including the inner surface (wall surface C) and region "b" between the two regions. The polyvinylpyrrolidone content ratio in each obtained region was determined by NMR measurement in the same manner as described above.

(7) Measurement of Solution Viscosity of Membrane-Forming Solution

A wide-mouth bottle containing the membrane-forming solution was placed in a thermostatic bath and set so that the liquid temperature was the temperature at discharge from the double-tube nozzle. The viscosity was measured using a Brookfield viscometer.

(8) Measurement of Polyvinylpyrrolidone Weight-Average Molecular Weight

A sample solution containing polyvinylpyrrolidone dissolved in DMF at a concentration of 1.0 mg/ml was prepared and used for GPC measurement under the following conditions to determine the weight-average molecular weight (based on PMMA).

Apparatus: HLC-8220GPC (Tosoh Corp.)
Column: ShodexKF-606 M, KF-601
Oven: 40° C.
Mobile phase: 0.6 ml/min DMF
Detector: Differential refractometer
PMMA standard molecular weights: 1,944,000, 790,000, 281,700, 144,000, 79,250, 28,900, 13,300, 5720, 1960.

(9) Measurement of Filtration Performance

The porous membranes obtained in the examples and comparative examples were used to prepare mini-modules with membrane surface areas of 100 cm$^2$, and the initial purified water permeation was measured with internal pressure filtration at a filtration pressure of 50 kPa. The purified water used was water filtered with a UF membrane having a molecular cutoff of 6000, after deionization. As a model solution for filtration testing of the suspension there was prepared a 0.01 wt % aqueous solution of 0.6 μm polystyrene uniform latex. The module and solution were used for a filtration test at a filtration pressure of 30 KPa and an in-module circulating linear speed of 0.5 msec, and the time required for filtration of 1 L of solution and the latex rejecting rate were measured. Next, back washing with purified water was carried out for 5 minutes at a backwash pressure of 30 kPa, and the purified water permeation was again measured. The purified water permeation recovery factor with back washing was determined from the initial purified water permeation and the purified water permeation after filtration and back washing.

Example 1

There were dissolved 18 wt % of polysulfone (Udel P3500, product of Solvay Advanced Polymers) and 15 wt % of polyvinylpyrrolidone (Luvitec k80, product of BASF) in 62 wt % of N-methyl-2-pyrrolidone at 70° C. while stirring, and then 5 wt % of glycerin was added and stirring was continued to prepare a membrane-forming solution. The membrane-forming solution was extruded from a double-ring spinning nozzle (outer diameter: 2.4 mm, middle diameter: 1.2 mm, inner diameter: 0.6 mm; same used in the following examples) at 70° C. together with a 90 wt % NMP aqueous solution as the internal solidifying solution, and it was then passed through a 50 mm air-gap section and solidified in water at 80° C. During this time, the region from the spinneret to the coagulating bath was surrounded by a temperature-adjustable tubular piece with a base area of 38 cm$^2$, and the air-gap section was kept at a temperature of 75° C. and a relative humidity of 100% (absolute humidity: 240 g/m$^3$). After removing the solvent in water, the polyvinylpyrrolidone was decomposed for 15 hours in a 2000 ppm sodium hypochlorite aqueous solution and washed at 90° C. for 3 hours to obtain a porous hollow fiber membrane. The properties of the obtained membrane are shown in Table 1.

Example 2

There were dissolved 18 wt % of polysulfone (Udel P3500, product of Solvay Advanced Polymers) and 13 wt % of polyvinylpyrrolidone (Luvitec k80, product of BASF) in 64 wt % of dimethylacetamide at 70° C. while stirring, and then 5 wt % of glycerin was added and stirring was continued to prepare a membrane-forming solution. The membrane-forming solution was used to obtain a porous hollow fiber membrane by the same method as Example 1. The properties of the obtained membrane are shown in Table 1.

Example 3

There were dissolved 18 wt % of polysulfone (Udel P3500, product of Solvay Advanced Polymers) and 15 wt % of polyvinylpyrrolidone (Luvitec k80, product of BASF) in 67 wt % of N-methyl-2-pyrrolidone at 70° C. while stirring, to prepare a membrane-forming solution. The membrane-forming solution was used to obtain a porous hollow fiber membrane by the same method as Example 1. The properties of the obtained membrane are shown in Table 1.

Example 4

There were dissolved 18 wt % of polysulfone (Udel P3500, product of Solvay Advanced Polymers) and 25 wt % of polyvinylpyrrolidone (Luvitec k30, product of BASF) in 52 wt % of N-methyl-2-pyrrolidone at 70° C. while stirring, and then 5 wt % of glycerin was added and stirring was continued to prepare a membrane-forming solution. The membrane-forming solution was extruded from a double-ring spinning nozzle at 70° C. together with a 90 wt % NMP aqueous solution as the internal solidifying solution, and it was then passed through a 50 mm air-gap section and solidified in water at 80° C. During this time, the region from the spinneret to the coagulating bath was surrounded by a temperature-adjustable tubular piece with a base area of 38 cm², and the air-gap section was kept at a temperature of 75° C. and a relative humidity of 100% (absolute humidity: 240 g/m³). After removing the solvent in water, the polyvinylpyrrolidone was decomposed for 3 hours in a 2000 ppm sodium hypochlorite aqueous solution and washed at 90° C. for 3 hours to obtain a porous hollow fiber membrane. The properties of the obtained membrane are shown in Table 1.

Example 5

There were dissolved 18 wt % of polysulfone (Udel P3500, product of Solvay Advanced Polymers) and 15 wt % of polyvinylpyrrolidone (Luvitec k90, product of BASF) in 62 wt % of N-methyl-2-pyrrolidone at 70° C. while stirring, and then 5 wt % of glycerin was added and stirring was continued to prepare a membrane-forming solution. The membrane-forming solution was used to obtain a porous hollow fiber membrane by the same method as Example 1, except that the tubular piece surrounding the air-gap section had a base area of 10 cm². The properties of the obtained membrane are shown in Table 1.

Example 6

There were dissolved 18 wt % of polysulfone (Udel P3500, product of Solvay Advanced Polymers) and 15 wt % of polyvinylpyrrolidone (Pitzcol k90, product of Dai-ichi Kogyo Seiyaku Co., Ltd.) in 62 wt % of N-methyl-2-pyrrolidone at 70° C. while stirring, and then 5 wt % of glycerin was added and stirring was continued to prepare a membrane-forming solution. The membrane-forming solution was used to obtain a porous hollow fiber membrane by the same method as Example 1. The properties of the obtained membrane are shown in Table 1.

Comparative Example 1

The filtration performance measurement described above was carried out for a PVDF hollow fiber membrane having a homogeneous structure with a pore size of 0.4 µm, as a hollow fiber membrane for Comparative Example 1. The measurement results are shown in Table 1.

Comparative Example 2

There were dissolved 20 wt % of polysulfone (Udel P3500, product of Solvay Advanced Polymers) and 18 wt % of polyvinylpyrrolidone (Luvitec k30, product of BASF) in 62 wt % of N-methyl-2-pyrrolidone at 60° C. while stirring, to prepare a membrane-forming solution. The membrane-forming solution was extruded from a double-ring spinning nozzle (outer diameter: 1.3 mm, middle diameter: 0.7 mm, inner diameter: 0.5 mm) at 60° C. together with a 95 wt % NMP aqueous solution as the internal solidifying solution, and it was then passed through a 60 mm air-gap section and solidified in water at 70° C. During this time, the region from the spinneret to the coagulating bath was surrounded by a temperature-adjustable tubular piece with a base area of 10 cm², and the air-gap section was kept at a temperature of 45° C. and a relative humidity of 100%. After removing the solvent in water, the polyvinylpyrrolidone was decomposed for 4 hours in a 2000 ppm sodium hypochlorite aqueous solution and washed at 80° C. for 20 hours to obtain a porous hollow fiber membrane. The properties of the obtained membrane are shown in Table 1. The polyvinylpyrrolidone content of the membrane was below the detection limit (0.1%).

Comparative Example 3

There were dissolved 15 parts by weight of polysulfone (Udel P3500, product of Solvay Advanced Polymers), 15 parts by weight of polyvinylpyrrolidone (Luvitec k90, product of BASF) and 3 parts by weight of water in 70 parts by weight of N-methyl-2-pyrrolidone at 60° C. while stirring, to prepare a membrane-forming solution. The membrane-forming solution was cast onto a glass plate to a film thickness of 180 µm, and after contacting it with air adjusted to a temperature of 25° C. and a relative humidity of 45% for 5 seconds at 2 msec, it was solidified in water at 25° C. to obtain a porous flat membrane. The properties of the obtained membrane are shown in Table 1.

TABLE 1

| | Example 1 | Example 2 | Example 3 | Example 4 | Example 5 | Example 6 | Comp. Ex. 1 | Comp. Ex. 2 | Comp. Ex. 3 |
|---|---|---|---|---|---|---|---|---|---|
| Surface A mean pore size (µm) | 3 | 3 | 3 | 3 | 3 | 2 | 0.4 | 2 | 2 |
| Surface C mean pore size (µm) | 30 | 24 | 31 | 25 | 32 | 25 | 0.4 | 30 | 22 |
| Minimum pore size layer pore size (µm) | 0.4 | 0.2 | 0.08 | 0.08 | 0.3 | 0.2 | 0.4 | 0.1 | 0.2 |
| Polyvinyl pyrrolidone content (wt %) | 1.2 | 0.8 | 1.1 | 0.2 | 1.6 | 2.1 | — | <0 | 3.8 |
| Inner diameter (µm) | 1410 | 1380 | 1420 | 1020 | 1450 | 1440 | 1400 | 670 | — |
| Outer diameter (µm) | 2320 | 2280 | 2300 | 1560 | 2350 | 2320 | 2200 | 970 | — |
| Membrane thickness (µm) | 455 | 450 | 440 | 270 | 450 | 440 | 400 | 150 | 160 |
| Region "a" hydrophilic polymer concentration Ca (%) | 1.6 | 1.2 | 1.5 | 0.4 | 2.1 | 2.4 | — | <0 | 3.6 |
| Region "b" hydrophilic polymer concentration Cb (%) | 0.8 | 0.7 | 0.8 | 0.2 | 1.6 | 2 | — | <0 | 4.2 |
| Region "c" hydrophilic polymer concentration Cc (%) | 0.6 | 0.5 | 0.6 | 0.1 | 1.1 | 1.7 | — | <0 | 3.7 |

TABLE 1-continued

|  | Example 1 | Example 2 | Example 3 | Example 4 | Example 5 | Example 6 | Comp. Ex. 1 | Comp. Ex. 2 | Comp. Ex. 3 |
|---|---|---|---|---|---|---|---|---|---|
| Region "a" mean pore size Pa (μm) | 0.6 | 0.4 | 0.3 | 0.3 | 0.6 | 0.4 | 0.4 | 0.3 | 0.5 |
| Region "b" mean pore size Pa (μm) | 7 | 5 | 6 | 6 | 6 | 5 | 0.4 | 5 | 6 |
| Region "c" mean pore size Pa (μm) | 10 | 9 | 10 | 10 | 10 | 9 | 0.4 | 9 | 8 |
| Polyvinyl pyrrolidone concentration distribution (Ca/Cc) | 2.67 | 2.2 | 2.31 | 1.54 | 1.91 | 1.41 | — | — | 0.95 |
| Membrane-forming solution viscosity (Pa · sec) | 80 | 43 | 65 | 27 | 131 | 170 | — | 21 | 22 |
| Polyvinyl pyrrolidone weight-average molecular weight | $4.4 \times 10^5$ | $4.4 \times 10^5$ | $4.4 \times 10^5$ | $2.5 \times 10^4$ | $6.4 \times 10^5$ | $8.2 \times 10^5$ | — | $2.5 \times 10^4$ | $2.5 \times 10^4$ |
| Initial purified water permeation (L/hr) | 79 | 45 | 21 | 25 | 63 | 39 | 27 | 41 | 9 |
| Time required for filtration (min/L) | 25 | 51 | 105 | 90 | 37 | 81 | 230 | 180 | 265 |
| Latex rejecting rate (%) | 99 | 99 | 99 | 99 | 99 | 99 | 99 | 99 | 99 |
| Purified water permeation after back washing (L/hr) | 70 | 45 | 19 | 20 | 51 | 33 | 20 | 18 | 7 |
| Purified water permeation recovery (%) | 89 | 88 | 90 | 80 | 81 | 85 | 74 | 44 | 78 |
| (St/So) × Ha | 2504 | 2548 | 2526 | 3724 | 650 | 2504 | — | 1313 | — |

Beer Fermentate Clarification Test

Example 7

The porous hollow fiber membrane obtained in Example 1 was placed in a module case with an effective length of 20 cm for a membrane surface area of 50 cm², to form a mini-module. An unfiltered pils beer fermentate was adjusted to 5° C. and conveyed through the module at a filtration pressure of 20 kPa and a linear speed of 1 msec, internal pressure filtration was carried out for 60 minutes, and the average permeation rate was measured. The measurement results are shown in Table 2.

Example 8

A beer fermentate clarification test was carried out in the same manner as Example 7, except that the unfiltered pils beer fermentate was conveyed at a linear speed of 0.5 m/sec. The measurement results are shown in Table 2.

Example 9

A beer fermentate clarification test was carried out in the same manner as Example 7, except that back washing was performed for 30 seconds every 10 minutes. The measurement results are shown in Table 2.

Comparative Example 4

A beer fermentate clarification test was carried out in the same manner as Example 7, except that a homogeneous membrane of polyvinylidene fluoride with a mean pore size of 0.4 μm (same as Comparative Example 1) was used instead of the porous hollow fiber membrane used in Example 7. The measurement results are shown in Table 2.

Comparative Example 5

A beer fermentate clarification test was carried out in the same manner as Example 7, except that the membrane prepared in Comparative Example 2 was used instead of the porous hollow fiber membrane used in Example 7. The measurement results are shown in Table 2.

Comparative Example 6

A beer fermentate clarification test was carried out in the same manner as Example 7, except that the flat membrane prepared in Comparative Example 3 was used instead of the porous hollow fiber membrane used in Example 7, and a flat membrane holder (membrane surface area: 28 cm²) was used. The measurement results are shown in Table 2.

TABLE 2

|  | Example 7 | Example 8 | Example 9 | Comp. Ex. 4 | Comp. Ex. 5 | Comp. Ex. 6 |
|---|---|---|---|---|---|---|
| Filtration pressure (kPa) | 20 | 20 | 20 | 20 | 20 | 20 |
| Linear speed (m/sec) | 1 | 0.5 | 1 | 1 | 1 | 1 |
| Back washing | No | No | Yes | No | No | No |
| Average filtration rate per membrane area (l/m²/hr) | 150 | 118 | 165 | 41 | 72 | 38 |

Industrial Applicability

According to the invention it is possible to provide a porous membrane that has higher strength to withstand temperature change or pressure change than conventional porous membranes, allows both an excellent filtration rate and fractionation property to be obtained, is resistant to accumulation of removed matter on the membrane surface and inside the membrane, is resistant to plugging of the membrane pores, can maintain a high filtration rate for prolonged periods and is easy to wash, as well as a process for its production, and a process for producing a clarified liquid using it.

Explanation Of Symbols

10: Double-tube nozzle, 11: internal fluid channel, 12: external fluid channel.

The invention claimed is:

1. A process for producing a porous membrane whose membrane wall is constructed of a hydrophobic polymer and a hydrophilic polymer, wherein when the membrane wall is divided into 3 sections in the film thickness direction to form region "a" containing one wall surface A of the membrane wall, region "c" containing the other wall surface C and region "b" between region "a" and region "c," the hydrophilic polymer content ratio $C_a$ in region "a" is greater than the hydrophilic polymer content ratio $C_c$ in region "c," and the mean pore size of the wall surface C is larger than the mean pore size of the wall surface A, which comprises a solidifying step in which an internal solidifying solution is discharged from the internal fluid channel of the double-tube nozzle, while a membrane-forming solution, comprising a hydrophobic polymer, a hydrophilic polymer, a good solvent for both of these polymers and a non-solvent for the hydrophobic polymer, is discharged from the external fluid channel of the double-tube nozzle, for solidification in the external solidifying solution, wherein a portion of the hydrophilic polymer is removed using an oxidizing agent-containing aqueous solution, either during or after the solidifying step.

2. The production process according to claim 1, wherein the external solidifying solution is a solidifying solution composed mainly of water and having higher solidifying power for the membrane-forming solution than the internal solidifying solution.

3. The production process according to claim 1, wherein the membrane-forming solution is a membrane-forming solution with a solution viscosity of between 30 Pa·sec and 200 Pa·sec at the temperature at which it is discharged from the double-tube nozzle.

4. The production process according to claim 1, wherein the hydrophilic polymer is polyvinylpyrrolidone with a weight-average molecular weight of between 20,000 and 1,000,000.

5. The production process according to claim 1, wherein the non-solvent is glycerin.

6. The production process according to claim 1, wherein the internal solidifying solution is an aqueous solution comprising at least 80 wt % and less than 100 wt % of a good solvent for the hydrophobic polymer.

7. The process for producing a porous hollow fiber membrane according to claim 1, in which an air-gap section surrounded by a tubular piece is provided between the surface of the double-tube nozzle over which the internal solidifying solution and membrane-forming solution flow out and the liquid surface of the external solidifying solution, and the outflow comprising the internal solidifying solution and membrane-forming solution is directed through the air-gap section and reaches the liquid surface of the external solidifying solution for the aforementioned solidifying step, with the following inequality (IV) being satisfied, where St is the base area of the tubular piece on the liquid surface side of the external solidifying solution, So is the outer surface area of the outflow that passes through the air-gap section, and Ha is the absolute humidity at the center of the air-gap section surrounded by the tubular piece:

$$650 \leq (St/So) \times Ha \leq 3764 \qquad (IV).$$

* * * * *

UNITED STATES PATENT AND TRADEMARK OFFICE
CERTIFICATE OF CORRECTION

PATENT NO. : 8,883,066 B2
APPLICATION NO. : 13/936835
DATED : November 11, 2014
INVENTOR(S) : Satoshi Shiki Page 1 of 1

It is certified that error appears in the above-identified patent and that said Letters Patent is hereby corrected as shown below:

In the Claims
Column 24, line 37 (claim 7, line 18) "$650 \leq (St/So) \times Ha \leq 3764$ (IV)" should read --$650 \leq (St/So) \times Ha \leq 3724$ (IV)--.

Signed and Sealed this
Twenty-fifth Day of August, 2015

Michelle K. Lee
*Director of the United States Patent and Trademark Office*